United States Patent
Oki

(10) Patent No.: US 9,506,736 B2
(45) Date of Patent: Nov. 29, 2016

(54) MEASUREMENT SYSTEM

(71) Applicant: Okuma Corporation, Niwa-Gun (JP)

(72) Inventor: Tadahiro Oki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 139 days.

(21) Appl. No.: 14/643,076

(22) Filed: Mar. 10, 2015

(65) Prior Publication Data

US 2015/0292852 A1    Oct. 15, 2015

(30) Foreign Application Priority Data

Apr. 10, 2014  (JP) ................................ 2014-081310

(51) Int. Cl.
G01B 5/008    (2006.01)
G01B 21/04    (2006.01)

(52) U.S. Cl.
CPC ............ G01B 5/008 (2013.01); G01B 21/042 (2013.01)

(58) Field of Classification Search
None
See application file for complete search history.

(56) References Cited

U.S. PATENT DOCUMENTS

| | | | | |
|---|---|---|---|---|
| 4,369,581 A * | 1/1983 | Lenz | ........................ | G01B 5/25 33/1 M |
| 5,694,339 A * | 12/1997 | Ishitoya | ............... | G05B 19/401 33/503 |
| 6,886,264 B2 * | 5/2005 | Sakata | ................... | G01B 7/282 33/502 |
| 7,055,367 B2 * | 6/2006 | Hajdukiewicz | ...... | G01B 21/042 33/501.02 |
| 8,494,800 B2 * | 7/2013 | Matsushita | .......... | G01B 21/045 702/95 |
| 8,800,159 B2 * | 8/2014 | Matsushita | .......... | G05B 19/404 33/503 |
| 9,002,502 B2 * | 4/2015 | Matsushita | .......... | G05B 19/404 318/569 |
| 9,002,503 B2 * | 4/2015 | Matsushita | .......... | G05B 19/401 318/646 |
| 2011/0040523 A1 | 2/2011 | Matsushita | | |
| 2011/0178782 A1 * | 7/2011 | Yang | .................... | G01B 21/042 703/2 |
| 2013/0205867 A1 * | 8/2013 | Liao | ..................... | G01B 21/042 73/1.79 |
| 2013/0253871 A1 * | 9/2013 | Gray | .................... | B23Q 17/22 702/95 |
| 2014/0130363 A1 * | 5/2014 | Hagino | .................... | G01B 5/22 33/503 |
| 2016/0018218 A1 * | 1/2016 | Nakagawa | ............. | G01B 5/008 33/503 |

FOREIGN PATENT DOCUMENTS

JP    2011-038902 A1    2/2011

* cited by examiner

*Primary Examiner* — Christopher Fulton
(74) *Attorney, Agent, or Firm* — Burr & Brown, PLLC

(57) ABSTRACT

A measurement system identifies geometric errors by using an initial position measurement step for specifying coordinates and dimensions of a target sphere, and an indexing measurement step for positioning rotary axes according to a plurality of indexing conditions and identifying geometric errors from sensor measured coordinate values corresponding to coordinate values obtained by measuring the target sphere with a sensor of a touch probe. Then, in the indexing measurement step, coordinates of the target sphere can be obtained by simply measuring the target sphere with the sensor only three times, using dimensions of the target sphere obtained in the initial position measurement step.

3 Claims, 7 Drawing Sheets

FIG. 5

| Measurement No. | Indexing angle | |
| --- | --- | --- |
| | A | C |
| 1 | 0 | 0 |
| 2 | 0 | 90 |
| 3 | 0 | 180 |
| 4 | 0 | 270 |
| 5 | −30 | 270 |
| 6 | −60 | 270 |
| 7 | −90 | 270 |

MEASUREMENT SYSTEM

BACKGROUND OF THE INVENTION

This application claims the benefit of Japanese Patent Application Number 2014-081310 filed on Apr. 10, 2014, the entirety of which is incorporated by reference.

Technical Field

The present invention relates to a measurement system for measuring and correcting geometric errors in a multi-axis machine tool.

Background Art

In the field of machine tools, to achieve highly efficient machining and to machine a workpiece having a complicated shape, multi-axis machine tools, such as a 5-axis machining center which includes a conventional 3-axis machining center with two rotary axes added, have been developed, and improvement of machining accuracy thereof have been expected. In general, assembling (manufacturing) thereof becomes more difficult and machining accuracy tends to be deteriorated as the number of axes increases, and there is a limit on improvement of machining accuracy through assembling. Thus, a correction system has been developed to improve machining accuracy by correcting so-called geometric errors such as the slant and positional errors between adjacent axes.

As a method for identifying geometric errors in the aforementioned correction system, there is known a method to obtain geometric errors from measurement results by using measuring instruments such as displacement gauge and right-angled square. The method described above, however, requires several measuring instruments, and identification accuracy using the method varies largely caused by uncertain measurement results due to different measuring skills or the like with the method. As a method for identifying geometric errors in the 5-axis machining center, there is also widely known measurement of simultaneous 3-axis arc interpolation motion using a displacement sensor called a ball bar (i.e. method for identifying geometric errors from the amount of deviation at the center of an circular trajectory that is obtained by synchronizing two linear axes and one rotary axis and causing a circular motion of a ball bar so as to maintain relative displacement between one point and a main spindle on a table). However, the method requires a special measuring instrument, for example, a ball bar and identification accuracy varies depending on the setting of the ball bar.

Therefore, a measurement system as shown in Japanese Patent Application Publication No. 2011-038902 (JP 2011-038902 A) was developed to obtain geometric errors by using a touch probe (which is often mounted on machine tools) and a sphere serving as a target (target sphere), based on the same principle as the measurement of simultaneous 3-axis arc interpolation motion using a ball bar. In the measurement system, for example, to obtain geometric errors at a trunnion table type 5-axis machining center, a target sphere is set on the table initially to measure established coordinates. Afterwards, various angles are indexed for rotary axes, and center coordinates and a diameter of the target sphere are measured under each indexing condition. Then, the amount of deviation at the center of an arc trajectory drawn by these plural coordinates of the target sphere is calculated to identify a geometric error. Besides, when geometric errors is identified by the measurement system, center coordinates and a diameter of the target sphere positioned by indexing the rotary axes are measured by using three linear axes. For example, the touch probe is brought into contact with the target sphere by a motion made by only one certain axis to the target sphere, more specifically, by a uniaxial motion from +X direction, -X direction, +Y direction, -Y direction and +Z direction in order to calculate center coordinates and a diameter of the target sphere from coordinates of four or more contact points.

SUMMARY OF INVENTION

The system according to JP 2011-038902 A, however, requires much labor and time to measure center coordinates as well as a diameter of the target sphere because the touch probe has to be brought into contact with a target sphere many times (four times or more). Thus, a method may be adapted to measure center coordinates of the target sphere while reducing the number of times of a contact of the touch probe with the target sphere to, for example, three times. However, when the number of contact time is reduced, a diameter value of the target sphere has to be obtained correctly beforehand by using another method. Besides, if there is an error in the diameter value of the target sphere for use in measurement, it will remain as a measurement error of center coordinates.

It is an object of the present invention to provide a measurement system that solves disadvantages of the measurement system in the above conventional multi-axis machine tools and is capable of accurately measuring center coordinates of a target sphere in a short period of time.

In the present invention, a first aspect of the present invention is a measurement system for measuring geometric errors of a multi-axis machine tool having three linear axes and two rotary axes by using an initial position measurement step and an indexing measurement step. In the multi-axis machine, a sensor is provided in one of a main spindle and a table and a target is provided in the other one. In the initial position measurement step, coordinates of the target or the sensor and dimensions of the target are specified. In the indexing measurement step, the rotary axes are positioned according to a plurality of indexing conditions and geometric errors are identified from sensor measured coordinate values that correspond to coordinate values obtained by measuring the target with the sensor. In the indexing measurement step, the target is measured with the sensor only three times to obtain center coordinates of the target, using the dimensions of the target obtained in the initial position measurement step.

According to a second aspect of the present invention, in the first aspect of the present invention, the target is a sphere, and the dimensions of the target obtained in the initial position measurement step correspond to a diameter value or a radius value. In the indexing measurement step, the diameter value or the radius value is referenced to obtain the sensor measured coordinate values so as to obtain center coordinates of the target.

According to a third aspect of the present invention, in the second aspect of the present invention, the sensor performs a uniaxial operation along each of the linear axes to approach the target. Center coordinates of the target are obtained by subtracting the diameter value or the radius value of the sphere serving as the target in the case where the sensor approaches the target from a plus direction of any of the linear axes. Alternatively, center coordinates of the target are obtained by adding the diameter value or the radius value of the sphere serving as the target in the case where the sensor approaches the target from a minus direction of any of the linear axes.

According to the measurement system of the present invention, to identify geometric errors in a multi-axis machine tool, in initial measurement to obtain coordinates of a target (e.g. sphere), coordinates of the target can be easily obtained without accurately measuring a diameter of the target beforehand using a three-dimensional measuring instrument and the like as described below. For example, a touch probe mounted at the tip of a main spindle is brought into contact with the target five times to measure center coordinates and a diameter value or radius value of the target, then the touch probe is brought into contact with the target three times through indexing rotary axes using an obtained index value or radius value of the target to measure a position of the target. Thus, in the measurement system of the present invention, time and labor spent for identifying geometric errors of multi-axis machine tools can be reduced substantially.

BRIEF DESCRIPTION OF DRAWINGS

FIG. 4A shows that the touch probe is brought into contact from +X direction, −X direction, +Y direction, and −Y direction and FIG. 4B shows that the touch probe is brought into contact from +Z direction.

FIG. 5 is a chart showing an example of indexing conditions.

FIG. 6A shows that the touch probe is brought into contact from +X direction and +Y direction and FIG. 6B shows that the touch probe is brought into contact from +Z direction.

DESCRIPTION OF EMBODIMENTS

Figure 1:
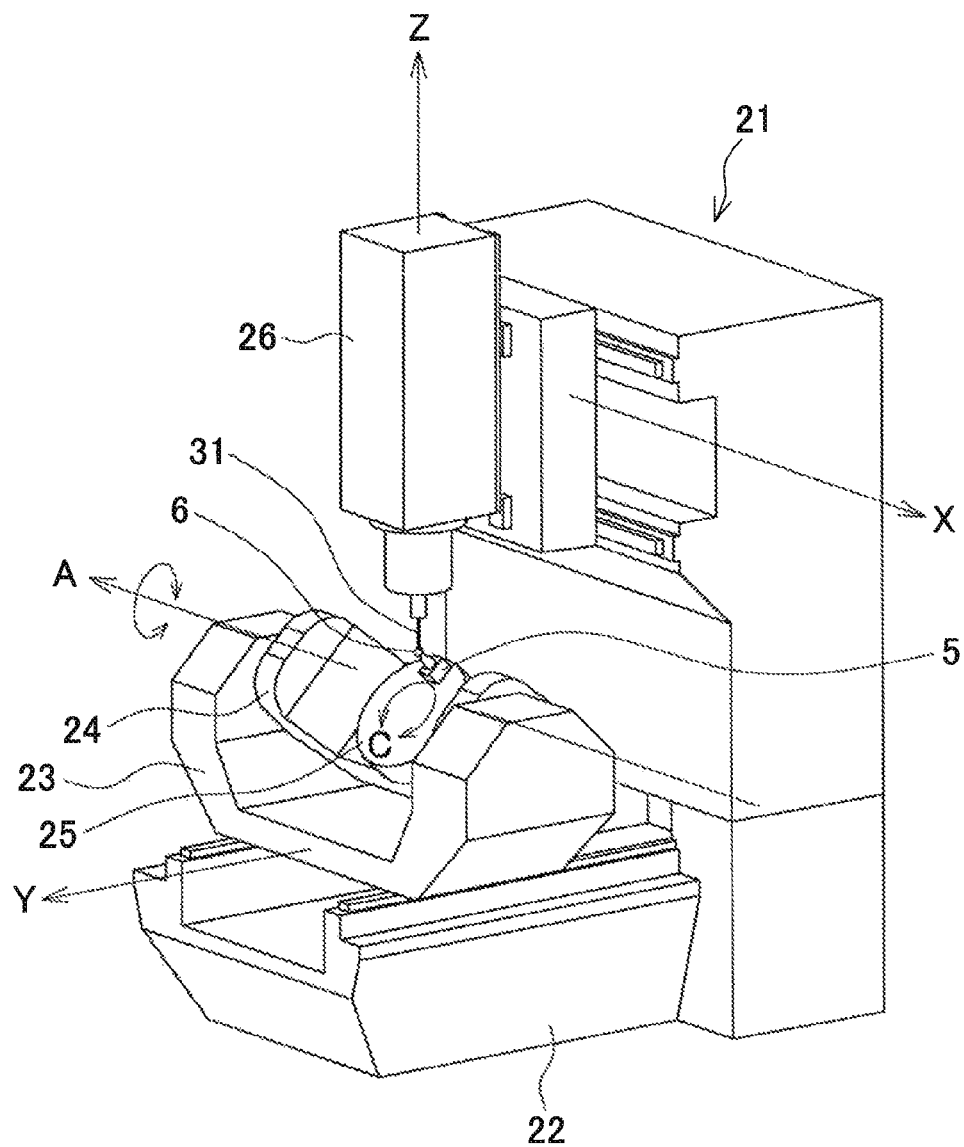
FIG. 1 is an explanatory diagram (or perspective view) showing a machining center.

One embodiment of the measurement system according to the present invention is described in detail below with reference to the accompanying drawings. FIG. 1 shows a 5-axis control machining center (a trunnion table type 5-axis machine) (hereinafter, simply referred to as a machining center 21) as an example of a multi-axis machine tool on which the measurement system according to the present invention is mounted. On a bed (or base) 22 of the machining center 21, a trunnion 23 formed into a substantial U shape in the front view is provided slidably along the Y axis. The trunnion 23 has a cradle 24 that is formed into a substantial U shape in the front view and arranged rotatably around the A axis (or rotary axis). The cradle 24 further has a disk-like table 25 that is arranged rotatably around the C axis (rotary axis) orthogonal to the A axis. Above the bed 22, a spindle head 26, on which a tool can be mounted, is also arranged slidably along the X axis orthogonal to the Y axis and along the Z axis orthogonal to the X axis and the Y axis. The spindle head 26 allows rotation of a tool mounted thereon (not shown) around the Z axis.

The machining center 21 performs various kinds of machining to a workpiece fixed to the table 25 in a state of controlling relative positions and relative attitudes of the workpiece and the tool by making the spindle head 26 approach the workpiece relatively while rotating a tool mounted on the spindle head 26. Owing to the above configuration of the machining center 21, the order of the axes from the workpiece to the tool, which indicates positional relation between the workpiece and the tool, starts from the C axis to the A axis, Y axis, X axis and Z axis.

Figure 2:
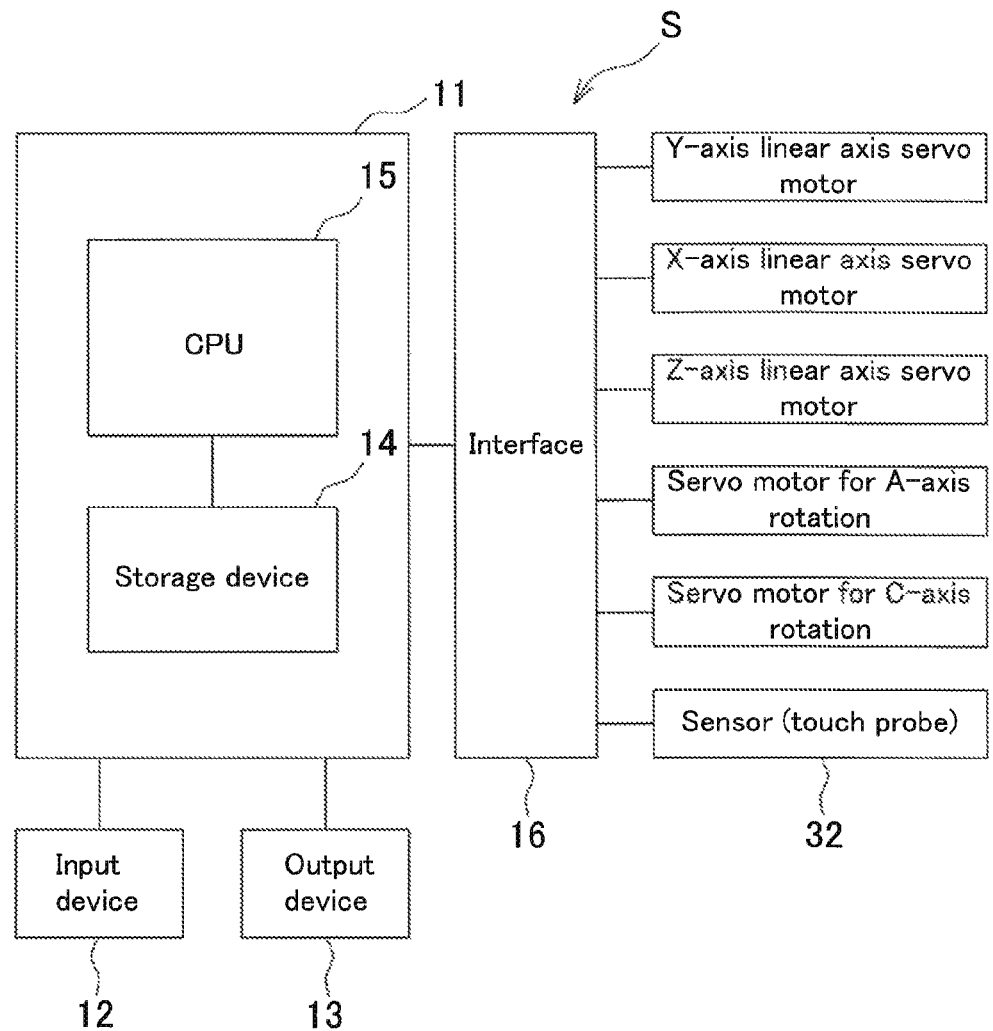
FIG. 2 is a block diagram showing a control mechanism of the machining center.

FIG. 2 is a block diagram showing a control mechanism of the above machining center 21. In a controller (numerical controller) 11, respective servo motors for translating the trunnion 23 and the spindle head 26, respective servo motors for rotating the cradle 24 and the table 25, a sensor 32 of the touch probe 31 mounted on a tip of the spindle head 26 as will be discussed later and the like are connected to a CPU 15 via an interface 16. Operational details of the trunnion 23, the spindle head 26, the cradle 24 and the table 25 are controlled to be driven by the controller 11. The controller 11 is also connected to an input device 12 for setting indexing positions (indexing conditions) and the like, an output device 13 such as monitor and speaker, and the like. The controller 11 is also provided with a storage device 14. The storage device 14 internally stores a geometric error calculation program for identifying (or calculating) geometric errors by displacing the touch probe 31 mounted on the spindle head 26, a correction program for correcting geometric errors based on identified geometric errors, and other programs. Then, a measurement system S for identifying geometric errors of the machining center 21 includes the controller 11, respective servo motors for translating the trunnion 23 and the spindle head 26, respective servo motors for rotating the cradle 24 and the table 25, the sensor 32 and the like.

Figure 3:
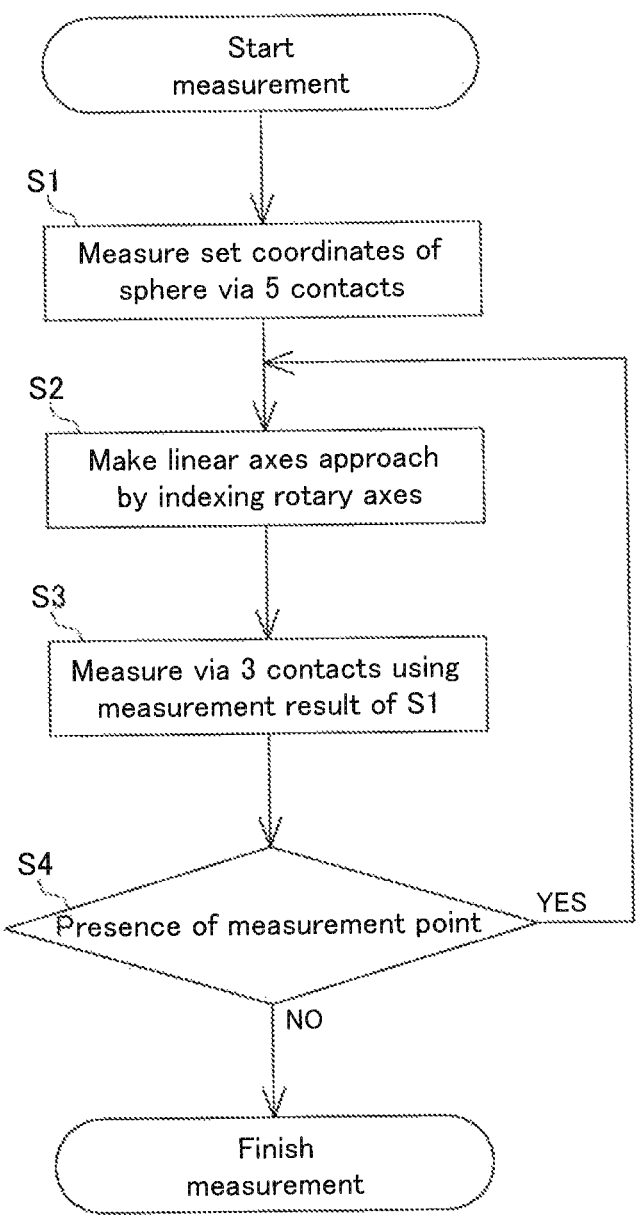
FIG. 3 is a flowchart showing details of processing to identify (measure) geometric errors.

FIG. 3 is a flowchart showing processing details in identifying geometric errors by the above measurement system S. To identify geometric errors, the touch probe 31 is mounted in place of a tool on the spindle head 26 and the target sphere 6 serving as a target is fixed to the table 25 (fixed by a magnet and the like mounted in the base 5 of the target sphere 6) as shown in FIG. 1. Further, the touch probe 31 has the sensor 32 (cf. FIG. 2) for sensing a contact with the target sphere 6 and can send signals by infrared ray, radio wave and the like upon sensing a contact. Meanwhile, the controller 11 causes the storage device 14 to store a current position of each axis as a measured value at the moment a signal sent from the sensor 32 is received by a connected receiver (or at the point with a delay taken into consideration).

Figure 4A:
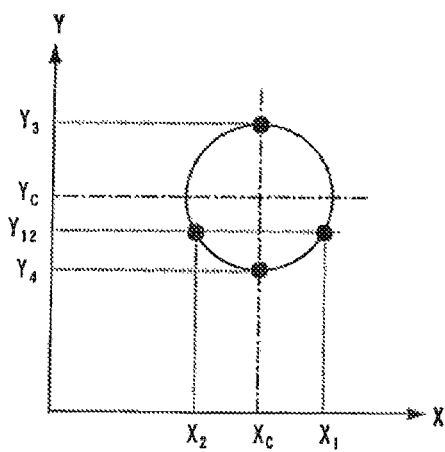
FIGS. 4A and 4B are explanatory diagrams showing a method to measure center coordinates and a radius of a target sphere by a touch probe being brought into contact with the target sphere five times.
Figure 4B:
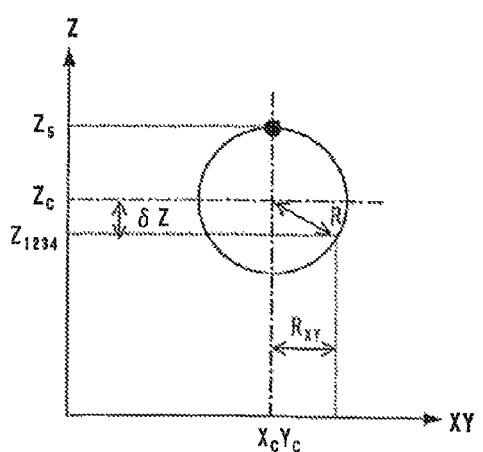

Then, after the touch probe 31 is mounted on the spindle head 26 as stated above, coordinates of the target sphere 6 arranged in any position are measured (S1). In this embodiment, description will be made for a method to measure center coordinates and a radius of the target sphere 6 by bringing the touch probe 31 into contact with the target sphere 6 five times, or more specifically, by bringing it into contact from +X direction, −X direction, +Y direction, −Y direction and +Z direction as shown in FIG. 4. In this measurement method, the touch probe 31 is firstly brought into contact with the touch probe 6 from +X direction and −X direction in a position where the Y axis is Y12 and the Z axis is Z1234 and thus measurement results (measured values) X1 and X2 are obtained. Then, from the obtained measurement results X1 and X2, an X-axis center coordinate XC as represented by expression 1 is calculated.

$$XC=(X1+X2)/2 \quad \text{Expression 1}$$

Next, the touch probe 31 is brought into contact with the target sphere 6 from +Y direction and −Y direction in a position where the X axis is XC and the Z axis is Z1234 and thus measurement results Y3 and Y4 are obtained. Then, from the obtained measurement results Y3 and Y4, a Y-axis center coordinate YC as represented by expression 2 and a radius RXY in a XY measured cross section as represented by expression 3 are calculated.

$$YC=(Y3+Y4)/2 \quad \text{Expression 2}$$

$$RXY=(Y3-Y4)/2 \quad \text{Expression 3}$$

Next, the touch probe 31 is brought into contact with the target sphere 6 from +Z direction in a position where the X axis is XC and the Y axis is YC and thus a measurement result Z5 is obtained. Owing to a geometric relationship among the measurement result Z5, a deviation δZ from a Z-axis center coordinate ZC and a radius R of the target sphere 6, expressions 4 and 5 are established.

$$R2=RXY2+(R-\delta Z)2 \quad \text{Expression 4}$$

$$\delta Z=Z5-Z1234 \quad \text{Expression 5}$$

According to the above relationship, the radius R of the target sphere 6 can be obtained by expression 6 and the Z-axis center coordinate ZC can be obtained by expression 7.

$$R=(RXY2+\delta Z2)/(2\cdot\delta Z) \quad \text{Expression 6}$$

$$ZC=Z5-R \quad \text{Expression 7}$$

Through such measurement, the accurate sphere radius R and the Z-axis center coordinate ZC can be measured easily even when the XY measurement cross section deviates from a vertex of the target sphere 6 due to unknown center coordinates of the target sphere 6.

Next, the measurement results of coordinates (center coordinates) set for the target sphere 6 as obtained above are used to start measurement for identifying geometric errors. For example, in the case of using indexing conditions as shown in FIG. 5, positions [Xn, Yn, Zn] of the target sphere 6 at the time the rotary axes were indexed are estimated, and the linear axes is caused to approach measurable positions (S2).

Figure 6A:
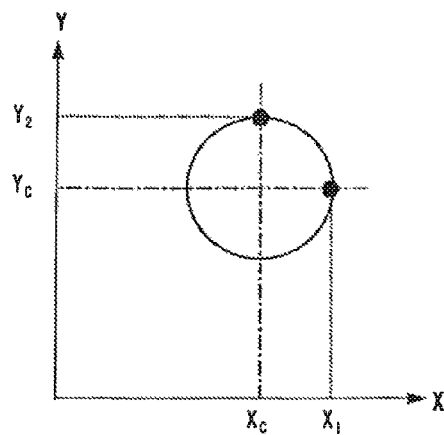
FIGS. 6A and 6B are explanatory diagrams showing a method to measure center coordinates of a target sphere using measurement results of a radius of the target sphere by a touch probe being brought into contact with the target sphere five times.
Figure 6B:
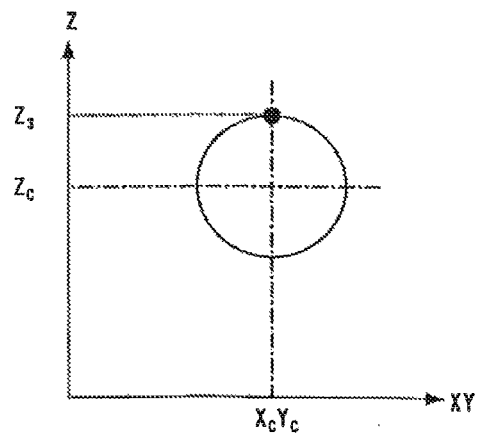

Next, the touch probe 31 is brought into contact with center coordinates of the target sphere 6 three times for measurement (S3). In this embodiment, description is made for a method to allow contacts from three directions that are +X direction, +Y direction and +Z direction as shown in FIG. 6. Firstly, from the measurement result X1 obtained through a contact of the touch probe 31 with the target sphere 6 from +X direction in a position where the X axis is Yn and the Z axis is Zn, the X-axis center coordinate XC is represented by expression 8.

$$XC=X1-R \quad \text{Expression 8}$$

Next, from a measurement result Y2 obtained by bringing the touch probe 31 into contact with the target sphere 6 from +Y direction in a position where the X axis is XC and the Z axis is Zn, the Y-axis center coordinate YC is represented by expression 9.

$$YC=Y2-R \quad \text{Expression 9}$$

Lastly, from a measurement result Z3 obtained by bringing the touch probe 31 into contact with the target sphere 6 from +Z direction in a position where the X axis is XC and the Y axis is YC, the Z-axis center coordinate ZC is as represented by expression 10.

$$ZC=Z3-R'' \quad \text{Expression 10}$$

Figure 7:
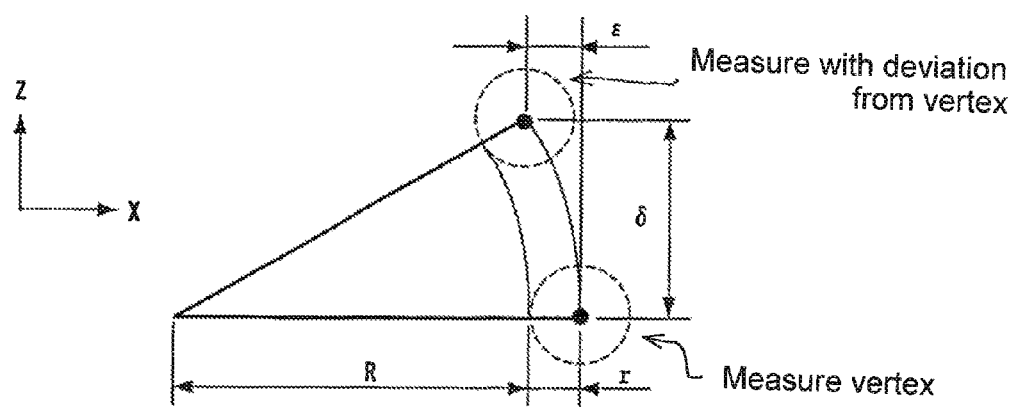
FIG. 7 is an explanatory diagram showing a relationship among a radius value, measurement error and deviated measurement position in measurement of center coordinates of a target sphere.

In these center coordinate measurements of the sphere obtained by the three contacts, when a measurement is made with a deviation from the vertex of the target sphere 6 by δ as shown in FIG. 7 through a contact from +X direction for example, there is an error in a contact value provided by the sensor 32 by ε. From a geometric relationship among the ε, the deviation δZ from the center coordinate ZC in the Z axis and the radius R of the target sphere 6, expression 11 is established. Note that r is a stylus radius of the touch probe 31.

$$(R+r)2=\delta 2+(R-\epsilon)2 \quad \text{Expression 11}$$

From the expression 11, ε corresponding to a measurement error is obtained as expression 12.

$$E=R-\sqrt{\{(R+r)2-\delta 2\}} \quad \text{Expression 12}$$

For example, on the assumption that the radius R of the target sphere 6 is 12.5 nun, the stylus radius r of the touch probe is 2.5 mm and the positional error 6 from the vertex is 0.1 mm, the measurement error ε is equal to 0.3 μm from the expression 12. Further, a position estimated in indexing the rotary axes does not involve an error as much as 0.1 mm in general and therefore its impact on the measurement result can be ignored.

As discussed above, after measurement of center coordinates of the target sphere 6, it is confirmed whether the next indexing measurement is present (S4). Then, if indexing measurement is determined to be present, processing is repeated from S2. If it is determined to be absent, the measurement is completed.

As stated above, the measurement system S identifies geometric errors by using the initial position measurement step (S1) for specifying coordinates of the target sphere 6 and dimensions of the target sphere 6 and the indexing measurement step (S3) for positioning the rotary axes according to a plurality of indexing conditions and identifying geometric errors from sensor measured coordinate values that corresponds to coordinate values obtained by measuring the target sphere 6 with the touch probe 31 (or sensor 32). In the measurement system S, coordinates of the target sphere 6 can be obtained using the dimensions of the target sphere 6 obtained in the initial position measurement step (S1) by simply performing three measurements of the target sphere 6 with the touch probe 31 (sensor 32) in the indexing measurement step (S3).

In other words, in the measurement system S, geometric errors can be obtained in an extremely easy manner as described below. Coordinates of the target sphere 6 is measured by the touch probe 31 being brought into contact with the target sphere 6 three times in indexing the rotary axes for identifying geometric errors, using a radius value obtained from the measurement for identifying coordinates of the target sphere 6 arranged in any position, without separately measuring an accurate value of the target sphere 6 beforehand by using a three-dimensional measuring instrument or the like. Thus, in the measurement system 5, time spent for measurements can be reduced substantially without affecting measurement accuracy.

The measurement system according to the present invention is not limited to the mode of the above embodiment and can be modified appropriately as needed in a range without deviating from the gist of the present invention. For example, measurements of a set position and a radius of the target sphere can be performed without being limited to a method in which the touch probe is brought into contact with the target as explained in the above embodiment and the method can be replaced with a method using a laser displacement gauge that allows contactless distance measurement or other methods. Besides, the measurement system according to the present invention is not limited to the one in which a radius of the target sphere is measured and center coordinates of the target are obtained based on the measured value as explained in the above embodiment, and it can be replaced with a system in which a diameter of the target sphere is measured and center coordinates of the target are obtained based on the measured value, or the like. Processing details in identifying geometric errors by the measurement system can also be modified appropriately as needed without being limited to the above details of the flowchart. Further, the measurement system according to the present invention is not limited to the one in which geometric errors are identified in a state where a sensor is provided in the touch probe of the main spindle and a target is provided in the table as explained in the above embodiment, and can be replaced with a system in which geometric errors are identified in a state where a target is provided in the main spindle and a sensor is provided in the table.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A measurement system for measuring geometric errors of a multi-axis machine tool having three linear axes and two rotary axes,
   the multi-axis machine tool having a sensor provided in one of a main spindle and a table and a target provided in the other one,
   using an initial position measurement step for specifying coordinates of the target or the sensor and dimensions of the target, and an indexing measurement step for positioning the rotary axes according to a plurality of indexing conditions and identifying geometric errors from sensor measured coordinate values corresponding to coordinate values obtained by measuring the target with the sensor, wherein
   in the indexing measurement step, the target is measured with the sensor only three times to obtain center coordinates of the target, using the dimensions of the target obtained in the initial position measurement step.

2. The measurement system according to claim 1, wherein:
   the target is a sphere;
   the dimensions of the target obtained in the initial position measurement step correspond to a diameter value or a radius value; and
   in the indexing measurement step, the diameter value or the radius value is referenced to obtain the sensor measured coordinate values so as to obtain center coordinates of the target.

3. The measurement system according to claim 2, wherein the sensor performs a uniaxial operation along each of the three linear axes to approach the target, and center coordinates of the target are obtained by subtracting the diameter value or the radius value of the sphere serving as the target in the case of making the sensor approach the target from a plus direction of any of the linear axes, or center coordinates of the target are obtained by adding the diameter value or the radius value of the sphere serving as the target in the case of making the sensor approach the target from a minus direction of any of the linear axes.

* * * * *